(12) United States Patent
Gestraud et al.

(10) Patent No.: US 12,348,496 B2
(45) Date of Patent: Jul. 1, 2025

(54) PROCESS FOR DECLARING THE NON-USABILITY OF EXCHANGED DATA

(71) Applicant: Orange, Issy-les-Moulineaux (FR)

(72) Inventors: Yann Gestraud, Chatillon (FR); Christophe Suart, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 514 days.

(21) Appl. No.: 17/295,000

(22) PCT Filed: Dec. 4, 2019

(86) PCT No.: PCT/FR2019/052927
§ 371 (c)(1),
(2) Date: May 18, 2021

(87) PCT Pub. No.: WO2020/128204
PCT Pub. Date: Jun. 25, 2020

(65) Prior Publication Data
US 2022/0021658 A1 Jan. 20, 2022

(30) Foreign Application Priority Data

Dec. 21, 2018 (FR) ...................................... 1874000

(51) Int. Cl.
*H04L 9/40* (2022.01)
*H04L 65/1069* (2022.01)
*H04L 65/65* (2022.01)
*H04L 69/24* (2022.01)
*H04W 12/02* (2009.01)

(52) U.S. Cl.
CPC .............. *H04L 63/04* (2013.01); *H04L 63/10* (2013.01); *H04L 65/1069* (2013.01); *H04L 65/65* (2022.05); *H04L 69/24* (2013.01); *H04W 12/02* (2013.01)

(58) Field of Classification Search
None
See application file for complete search history.

(56) References Cited

U.S. PATENT DOCUMENTS

| 10,257,167 | B1 * | 4/2019 | Matthews ........... H04L 12/4641 |
| 11,171,989 | B1 * | 11/2021 | Kim ...................... H04L 63/18 |
| 2002/0053029 | A1 | 5/2002 | Nakamura et al. |
| 2013/0268357 | A1 | 10/2013 | Heath |

OTHER PUBLICATIONS

International Search Report for International Application No. PCT/FR2019/052927 mailed on Feb. 20, 2020.

* cited by examiner

*Primary Examiner* — Jeffrey R Swearingen
(74) *Attorney, Agent, or Firm* — Knobbe, Martens, Olson & Bear, LLP

(57) ABSTRACT

A method of making secure a communication between a first and at least one second terminal is disclosed. Each terminal being configured to interact with a user via a corresponding human-machine interface, the method comprising selecting, on the first terminal, a usability index for signals in a stream; transmitting the stream from the first terminal to at least one node of a network; connecting a third-party device to the node according to the usability index; and receiving, on the at least one second terminal, the stream from the node.

17 Claims, 6 Drawing Sheets

PROCESS FOR DECLARING THE NON-USABILITY OF EXCHANGED DATA

CROSS-REFERENCE TO RELATED APPLICATIONS

This application is filed under 35 U.S.C. § 371 as the U.S. National Phase of Application No. PCT/FR2019/052927 entitled "PROCESS FOR DECLARING THE NON-USABILITY OF EXCHANGED DATA" and filed Dec. 4, 2019, and which claims priority to FR 1874000 filed Dec. 21, 2018, each of which is incorporated by reference herein in its entirety.

BACKGROUND

Field

The invention relates to the field of telecommunications networks. In particular, it relates to a method and a system for declaring the non-usability of exchanged data, in order to implement a secure communication between several terminals.

Description of the Related Technology

Today there are many existing telecommunications solutions for establishing communication between the terminals of multiple users by connecting these terminals to one or more networks whose accesses are provided by a telecommunications operator, for example via the Internet.

However, different users may subscribe to different operators, these operators providing services and accesses to networks which are not necessarily identical. These solutions must therefore be able to establish communications on networks managed by different operators.

In this context, various mobile telecommunications standards are known, for example the RCS ("Rich Communication Suite") protocol, which defines a communication standard making it possible to initiate an enriched communication between two terminals that are compatible with this protocol.

Defined by the GSMA ("Global System for Mobile Communications Association"), the RCS protocol allows the exchange of messages or files between users who have subscribed to different operators. This communication protocol is used between the networks of two different mobile telephone operators, and between an operator's core network and the telephones of users subscribed to it. This protocol also makes it possible to replace simple text messages with a rich messaging system in order to transmit more sophisticated multimedia streams.

It is thus possible for several users to converse by voice, to add a video stream to the communication, to send multimedia messages, to create discussion groups, to share a location, to superimpose images onto a video conversation window, or to exchange any file with one or more contacts whose terminals are compatible with the RCS standard but who have not necessarily subscribed to the same operator.

Communication protocols such as the RCS protocol thus allow different users to communicate with each other without necessarily subscribing to the same operator, the infrastructure and servers used for their communications not necessarily belonging to the same service provider.

However, although an operator providing network access to a source terminal guarantees compliance with the given rules of content usability for communications on the network, other operators, for example the operator of the destination terminal, do not necessarily follow these same rules. The use of these communications is therefore permitted without the users' knowledge, which leads to several disadvantages.

A first disadvantage is that the data transfer rate of messages exchanged during a group communication between several terminals can be negatively affected in the event of a connection of a third-party device to the communication, for example an additional terminal adding to the communication or an aggregator trying to capture the messages exchanged.

Another disadvantage is that many operators, for commercial operating purposes, capture and analyze the data exchanged over the networks to which they provide access, for example images and files shared during communications. For example, many operators provide access to virtual assistants which are configured to read, post-process, save, and analyze the content of text and voice communications between users of these networks.

In addition, the growing number of artificial intelligence devices, or more generally devices capable of analyzing very large amounts of data, means that more and more communications are subjected to a review of their content by third-party devices, sometimes without the knowledge of the users or without allowing these users to limit or prohibit, during or after the communication, the use of the data sent or received.

There is therefore a need to be able to keep secure and confidential the messages and signals exchanged during a communication between the terminals of several users, and in particular to allow managing the usability of these signals.

SUMMARY OF CERTAIN INVENTIVE ASPECTS

In order to meet this or these needs, a first aspect of the invention relates to a method of making secure a communication between a first and at least one second terminal, each terminal being configured to interact with a user via a corresponding human-machine interface, said method comprising:

selecting, on said first terminal, a usability index for signals in a stream;

transmitting said stream from the first terminal to at least one node of a network;

connecting a third-party device to the node according to the usability index; and receiving, on said at least one second terminal, the stream from the node.

Herein, a human-machine interface is any type of system or device making it possible to connect a user to a machine and to present data in various forms, for example in a textual, audio, and/or visual manner. It may be a screen integrated into a machine, for example a computer screen or a touchscreen tablet, a speaker, a holographic projector, etc.

Herein, a signal is any type of message encoded by a terminal so that it can be communicated remotely via the transmission of a stream of signals, a stream being a set or a succession of such signals sent from a source. A signal may comprise raw data, text data, audio data, video and/or audiovisual data to enable communication between multiple users interacting with a terminal by means of a human-machine interface.

Herein, by default the terminal is configured to be authorized to access and connect to the network by a telecommunications operator, and in particular by an operator to which the user has subscribed. A third-party device is any type of device capable of connecting to the network, for example a server or an aggregator, but for which access is not necessarily provided by this same operator.

The invention allows users to manage the security of the usability of the signals transmitted during a communication in the event that a third-party device such as a data aggregator, another operator, or another network attempts to capture these signals.

The invention thus provides a simple solution enabling users to define the usability rules for the signals and messages that they send when these are transmitted by different networks.

In one embodiment of the invention, the connection comprises a denial of access by the third-party device to the signals if the usability index is a denial attribute.

This makes it possible to limit or even prohibit a third-party device from capturing the signals of a stream transmitted by a user's terminal in order to make use of them during the communication or after the communication is terminated.

In one embodiment of the invention, the connection comprises an authorization for the third-party device to read the signals if the usability index is a processing attribute.

This makes it possible to authorize a third-party device to capture the signals of a stream transmitted by a user's terminal but only during a given communication with another terminal, for example when the third-party device is an automated virtual personal assistant ("chatbot") which is participating in the communication, for example to respond to user requests, but without processing at a later time the signals exchanged.

In one embodiment of the invention, the connection comprises an authorization for the third-party device to post-process the signals if the usability index is a post-processing attribute.

This makes it possible to authorize a third-party device to capture the signals of a stream transmitted by a user's terminal in order to make use of them only after the communication is terminated, for example when the third-party device is an external device which does not participate in the communication, for example a device for analyzing a large amount of data ("Big Data").

In one embodiment of the invention, the usability index is comprised in a transmission initiation message, said message being sent by the first terminal after selection and before transmission.

Herein, an initiation message is a message passing through one or more network nodes, which then serve to transmit streams of signals from the first terminal; this allows each node to receive the usability indices selected on this terminal before any signal is captured by the third-party device during a connection to these nodes. For example, an initiation message is an invitation message making it possible to connect two terminals.

In one embodiment of the invention, the usability index is comprised in at least one signal of the stream.

Thus, to access the communication for the purpose of capturing signals from its streams, another terminal or a third-party device must connect to at least one node of the network and comply with the connection and access rules comprised in the initiation message, and in particular must comply with the usability indices selected on the first terminal.

In one embodiment of the invention, the communication is implemented via a communication protocol selected among: an RCS protocol, an SDP protocol, an RTSP protocol, an MSRP protocol, and/or a SIP protocol.

For example, the communication or a negotiation of the communication is implemented via an SDP protocol and a SIP protocol.

This allows the communication to include signaling means defining the parameters of the communication to be established, and in particular to establish this communication by following the access and confidentiality rules associated with these parameters and with the values of the usability indices selected on the first terminal.

Herein, a communication protocol is adapted to implement signaling mechanisms, for example encoding signals to define the characteristics of the communication that a user wishes to establish.

For example, an SDP protocol ("Session Description Protocol") is a communication protocol for describing the initialization parameters of a streaming session, in transmission and in reception. The SDP protocol makes it possible to describe multimedia communication sessions, for example for the announcement of a communication session established between two terminals, the invitation to the session, and the negotiation of parameters. The use of an SDP protocol therefore makes it possible to create a communication environment but without delivering the stream itself or the signals it comprises, for example multimedia signals. Advantageously, the SDP protocol is extensible and accepts other media types and formats.

An SDP protocol can be used alone or in conjunction with other protocols such as an RTP protocol ("Real-time Transport Protocol"), an RTSP protocol ("Real-Time Streaming Protocol"), a SIP protocol ("Session Initiation Protocol"), or other types of protocols such as, for example, stand-alone formats which allow describing multicast sessions.

An SIP protocol is a protocol normalized and standardized by the IETF ("Internet Engineering Task Force") which allows establishing, modifying, and terminating a multimedia communication session. It thus makes it possible to authenticate or even locate several participants, and to negotiate the types of media that can be used by the participants by encapsulating SDP messages. This protocol allows using all types of data, signals, and protocols during a communication, for example in an audio, video, and/or VoIP ("Voice Over IP") session.

In one embodiment of the invention, the streams of signals and/or the data that they contain are transmitted via an MSRP ("Message Session Relay Protocol") or RTP protocol, for example according to an RCS standard.

These protocols also allow a terminal to format at least one usability index according to the conditions for establishing the communication. For example, if a signal transmitted during the communication is textual, the index will be adapted to the human-machine interface of the destination terminal for implementing this communication. In the case of an audiovisual communication, the index is adapted to a sound and/or image which can be received by the destination terminal, etc.

In one embodiment of the invention, the connection comprises a modification of the usability index by the first terminal.

This allows the users of the terminals to modify, during the communication, the security of the signals exchanged during the communication, for example manually when a user is warned that a third-party device has just connected to the network or that another terminal has just been added to the communication.

In one embodiment of the invention, the at least one signal in the stream is a type of signal on which the usability index depends, and is selected among: a text signal, an audio signal, a visual signal, and/or an audiovisual signal.

This makes it possible to make a communication secure with different usability rules depending on the type of signal transmitted; for example, during the same communication a user may wish to prohibit any external usability of his text signals in order to prevent the possible disclosure of confidential elements, and, simultaneously, to authorize only the saving of his audiovisual signals to prevent a third-party device that is accessing the communication from increasing the latency.

In one embodiment of the invention, the third-party device is at least a third terminal configured to interact with a corresponding user via a human-machine interface.

This makes it possible to manage and make secure the usability of the signals exchanged during a grouped communication, an additional terminal being added to a communication already established between at least two terminals, each of these terminals transmitting and receiving streams through possibly different networks.

According to another aspect, the invention relates to a communication system configured to make a communication secure between a first and at least one second terminal, said system comprising: said first terminal, comprising a module for selecting a usability index for signals in a stream and comprising a module for transmitting the stream to at least one node of a network; a module for connecting the node to a third-party device according to the usability index; and said at least one second terminal, comprising a module for receiving the stream from the node.

In one embodiment of the invention, the connection module prohibits said third-party device from accessing the signals if the usability index is a denial attribute.

In one embodiment of the invention, the connection module allows the third-party device to read the signals if the usability index is a processing attribute.

In one embodiment of the invention, the connection module allows the third-party device to post-process the signals if the usability index is a post-processing attribute.

In one embodiment of the invention, the first terminal further comprises an initiation module, said module being configured to send a transmission initiation message, said message comprising the usability index.

In one embodiment of the invention, the transmission module is configured to transmit the stream to at least one network node, said stream comprising the usability index.

The above features of the invention, taken alone or in combination when such is technically possible, make it possible to provide a method and a system for declaring the non-usability of data exchanged during a communication. This method and this system improve the security of the signals exchanged via one or more interconnected networks, by allowing their use to be managed directly by the users of the terminals participating in the communication, via an adaptation of the protocols used.

According to another aspect, a computer program is proposed comprising instructions for implementing all or part of a method as defined herein when this program is executed by a processor, for example a data processor. These instructions can be stored in a memory of a computing device, for example a server, loaded and then executed by a processor of this computing device.

BRIEF DESCRIPTION OF THE DRAWINGS

Other features, details, and advantages of the invention will become apparent from reading the detailed description below, and from analyzing the accompanying drawings, in which.

Unless otherwise indicated, common or similar elements in several figures bear the same reference signs and have identical or similar characteristics, so for simplicity these common elements are generally not described again.

DETAILED DESCRIPTION OF CERTAIN ILLUSTRATIVE EMBODIMENTS

Herein, a communication between several users, several terminals, and/or the human-machine interfaces of these terminals consists of an exchange of messages. In addition, the sending and receiving of particular messages causes an internal state change of these elements. For example, the sending of an enriched message from a first terminal to a second terminal via a network can cause the modification of an internal database of this second terminal, or the triggering of a remote control action of an element connected to a node of the network.

Herein, a network node is a physical element connected to the network and configured to transmit streams of signals from and to a terminal and/or another network node. Such an element is for example a server, a workstation, a router, a printer, or a fax machine. Typically, a network node is connected to the network by means of a network card or a local area network driver.

Herein, different entities are connected to each other by various means, for example via a wired connection of the Ethernet or PLC type, a wireless connection for example of the WiFi or Bluetooth type, or any other type of connection which can vary according to the preferred hardware for implementing the invention.

Figure 1:
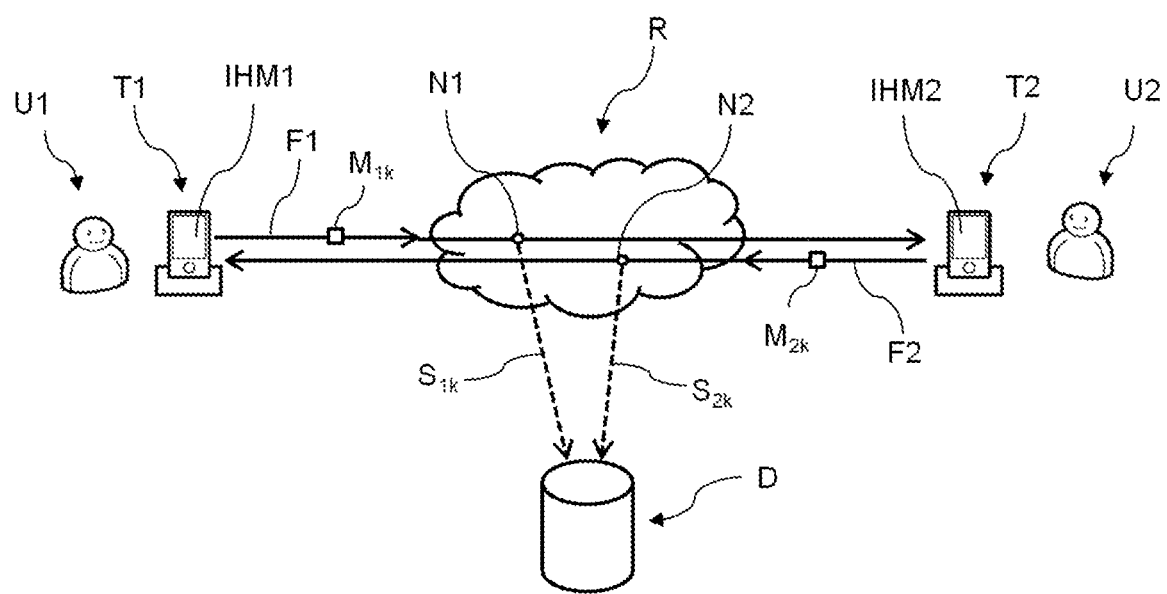
FIG. 1, shows a schematic view of an environment comprising in particular two terminals and a network for making a communication secure according to one particular embodiment of the invention.

An embodiment of the invention is now described with reference to FIG. 1, which schematically shows an environment for implementing a method of making a communication secure between two users.

This environment comprises in particular a first terminal T1 of a first user a first human-machine interface IHM1 installed on this first terminal T1, a second terminal T2 of a second user U2, and a second human-machine interface IHM2 installed on this second terminal T2. Alternatively, the network R may consist of several interconnected networks R1, R2, R3, . . . .

The environment further comprises a network R for implementing a communication, for example an exchange of enriched messages according to an RCS protocol, between the first terminal T1 and the second terminal T2. Access to the network R may be provided to the terminals by one or several operators. The communication is initiated by the first terminal T1 or by the second terminal T2.

A message or a stream of signals exchanged between terminals via a network R passes through at least one network node N of the network R. As shown, terminal T1 can send a stream F1 of signals passing through a node N1 of the network R and terminal T2 can send another stream F2 of signals passing through a node N2 of the same network. Node N1 may optionally be identical to node N2. Stream F1 comprises a plurality of signals S11, and stream F2 comprises a plurality of signals S2$k$, these signals possibly being of different types.

Herein, the first index "i" of a stream denoted "F i" and of a signal denoted S1$k$ in this stream designates the terminal "Ti" from which this stream is transmitted. The second index "k" of this signal "S1$k$" designates the type of signal transmitted in this stream.

According to one embodiment of the invention, a signal type may be textual, audio, video, or audiovisual. For example, a stream F1 transmitted by a terminal T1 comprises a textual type signal, S11, when the index "k" is equal to 1, an audio type signal, S12, when the index "k" is equal to 2, a video type signal, S13, when the index "k" is equal to 3, an audiovisual type signal, S14, when the index "k" is equal to 4, and so on.

In conjunction with this environment, a third-party device D can be configured to access the network R, and in particular, to connect to a node of the network R in order to capture signals from stream F1 or F2 passing through this node.

Herein, "capturing a signal" means that the third-party device D can read a signal without storing it in memory, save a signal without reading or processing it, save a signal while reading it or processing it, and/or transmit this signal to a device connected to the third-party device D but not necessarily to the network R.

At any time during a communication established between the two terminals T1 and T2, the third-party device D can capture a signal S1$k$ in stream F1 by connecting to node N1 and/or capture a signal S2$k$ in stream F2 by connecting to node N2.

In addition, a user "Ui" has the possibility of selecting, via his terminal "Ti", at least one usability index "Mik" for a signal "Sik" that comprises a stream "Fi" transmitted from this terminal.

Herein, "Mik" denotes the usability index for the type of signal denoted "Sik" in a stream "Fi" designating the terminal from which this stream is transmitted. The first index "i" and the second index "k" of this usability index "Mik" have the same meaning as the first and second indices of the corresponding signal "Sik".

During or prior to the transmission of a stream by a terminal, or prior to this transmission, the user U1 of the first terminal T1 selects the value of at least one usability index M1$k$ for a type of signal "k" that comprises the stream F1 to be transmitted to the network R or to at least one network node of the network R, this stream being subsequently received by terminal T2.

Thus, user U1 selects a value of one or more usability indices M1$k$ among M11, M12, M13, M14, . . . , etc. in order to define the usability of text signals, S11, audio signals, S12, video signals, S13, and/or audio-visual signals, S14, transmitted by his terminal T1 to the network R, then to T2 and/or to other terminals connected to R. Similarly, user U2 selects the value of at least one usability index M2$k$ for a type of signal S2$k$ that comprises the stream F2 to be transmitted to the network R, this stream subsequently being received by terminal T1.

For example, user U1 selects the value of a usability index M11 which prohibits the usability of text signals in stream F1, and user U2 selects the value of a usability index M22 that authorizes read access to audio signals. The possible definitions of selectable usability indices will be explained below.

Figure 2:
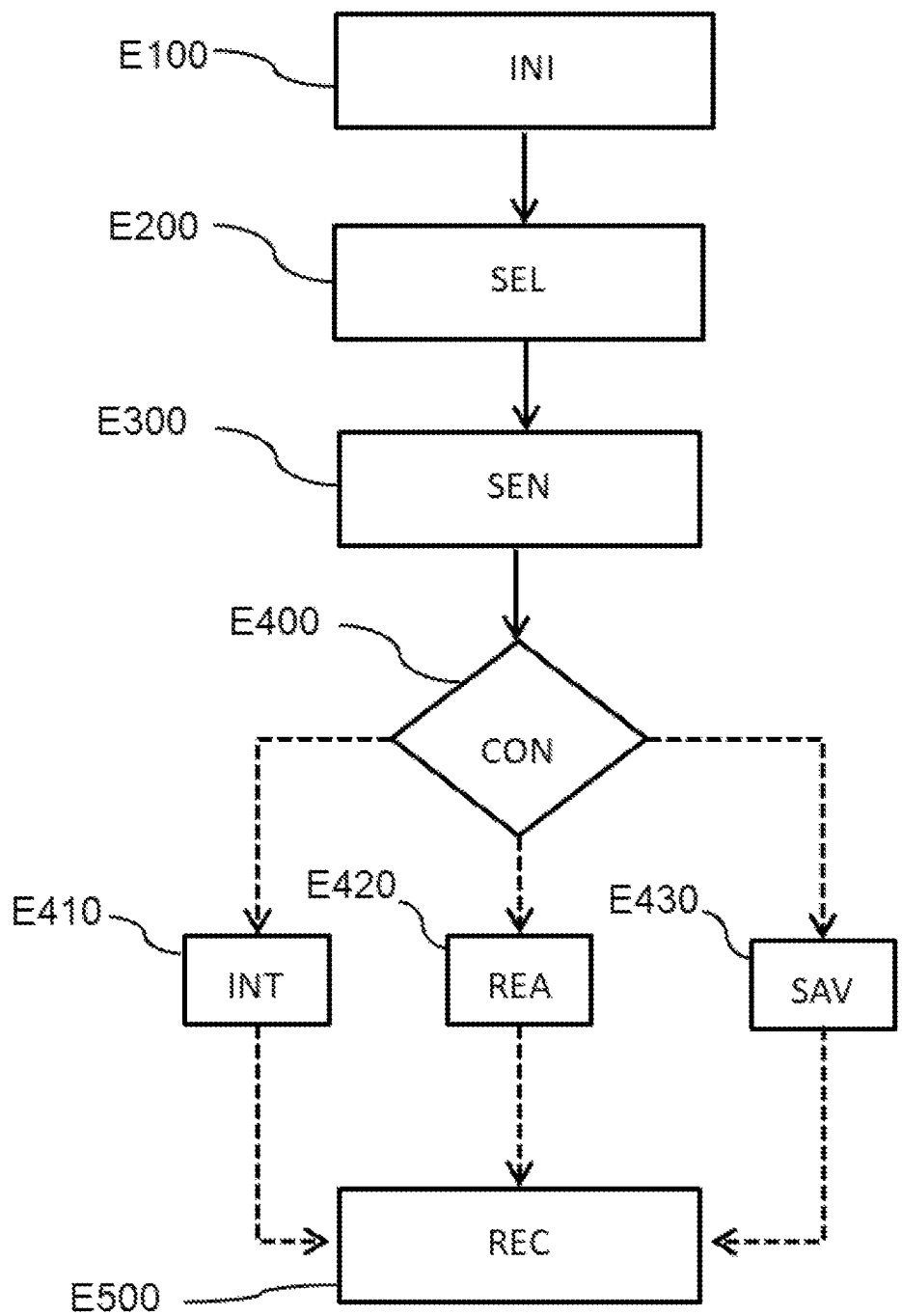
FIG. 2, shows, in the form of a flowchart, an example of steps of a determination method according to one particular embodiment of the invention.

One embodiment of the invention is now described with reference to FIG. 2, which shows, in the form of a flowchart, several steps of a method of making a communication secure according to one embodiment of the invention.

According to one embodiment of the invention, the method comprises a step E100, called the initialization step. This step E100 comprises a preliminary sub-step of the user starting up the terminal, during which the terminal requests an identification of the user or an authentication of the terminal on one or more networks from an operator providing access to this or to these networks.

According to one embodiment of the invention, step E100 comprises a sub-step of exchanging information relating to the capabilities of the terminals. This exchange makes it possible, for example, to ensure that each user has the capability of processing the communication. This exchange of information also makes it possible, for example, to guarantee that at least two users have subscribed to a telecommunications operator providing access to the same network or to separate networks compatible for transmitting the communication from one terminal to another. The method then allows the operators to take these usability indices into account in a simple and straightforward manner.

The method further comprises a step E200, SEL, called the selection step, which is implemented by terminal T1, during which a value of at least one usability index for the signals in a stream is defined, and what value. For example, the human-machine interface IHM1 of terminal T1 can ask user U1 if he wishes to assign a usability index for a future message he wishes to transmit during the communication. This selection step E200 will be explained below.

According to one embodiment of the invention, step E100 and/or step E200 comprises a sub-step of invitation to a connection, in particular via the sending of a communication initiation message from the terminal to the network and/or to at least one other terminal, before a stream of signals of the communication is transmitted to the network or the other terminal. This initiation message is configured to be captured by a device, terminal, or third-party device which connects to the network R via a node through which passes a stream of signals transmitted during the communication.

According to one embodiment of the invention, the initiation message comprises an invitation request which passes through at least one node of a network before reaching the other terminals participating in the communication. For example, a calling terminal T1 can send a communication request to another terminal T2 by sending an INVITE message according to a SIP protocol.

According to one embodiment of the invention, the initiation message conforms to a communication protocol such as an RCS protocol, an SDP protocol, an RTSP protocol, a SIP protocol, or any other possible combination of suitable protocols.

The method further comprises a step E300, SEN, called the transmission step, which is implemented by terminal T1, during which T1 sends a stream F1 of signals to one or more networks R, in particular to nodes of this or these networks. The stream F1 is then transmitted from the network(s) R to at least the second terminal T2 connected to R.

According to one embodiment of the invention, the initiation message comprises the usability indices for signals as selected during step E200. This allows a terminal or a third-party device D connecting to the network R to read and verify compatibility with these usability indices in a systematic manner.

In the case where an RCS protocol is used, communication may be established in combination with the use of a SIP protocol for signaling purposes. For example, a SIP initialization request containing attributes conforming to the SDP protocol is issued by the terminal as or within the initialization message to start the communication, transmitted by at least one network node. This request implements a SIP session during which, or before which, an exchange of capabilities between the terminals is carried out in order to verify that the destination terminal of the communication has the capability of processing the type of communication initiated by the source terminal. Therefore, a terminal or third-party device D connecting to the network R in order to capture the communication takes this request into account.

A communication may also be established by employing several protocols, for example an RCS, SIP, and SDP protocol to implement multimedia communication sessions. Such a combination allows the announcement of a session, the invitation to the session, and the negotiation of parameters. The use of an SDP protocol also makes it possible to create a communication environment without delivering the stream itself or the signals it comprises, for example multimedia signals.

In the case where an SDP protocol is used to implement the communication, the invitation message is an SDP message composed of several sections, for example three sections, including a first section relating to the parameters describing the communication session, a second section relating to the time synchronization of the communication, and a third section providing a description of the types of signals transmitted during the communication.

An SDP invitation message is for example composed of different lines of "<character>=<value>", where "<character>" denotes an alphabetic letter and where "<value>" is a structured text. A description of the session can be given by "o=(origin and session identifier: user name, identifier, version number, network address)" to define the initiator and/or recipient of the communication. A description of the time synchronization of the session can for example be given by "t=(time at which the session is activated)". A description of the types of signals transmitted during the communication can for example be given by "m=(name of the medium and address of the transport)".

According to one embodiment of the invention, the initialization step E100 and/or the selection step E200 comprise the addition of a usability index, for example an attribute in an initialization message or in an invitation request, to indicate if and when the signals in the stream can be made use of.

For example, the addition of a usability index comprises the writing, in the invitation message, of at least one additional attribute to define the usability of the signals which will be exchanged during the communication, this attribute comprising a line denoted "<datausability>=<value>" in a section of an SDP message.

According to one embodiment of the invention, the initialization step E100 and/or the selection step E200 comprise the addition of a usability index in one or more signals of the stream.

Advantageously, a usability index comprised in a signal of the stream of signals is transmissible as metadata, which avoids the use of an SDP protocol or other protocols usable for the negotiation, signaling, and/or transmission of the communication.

For example, several text signals can be transmitted independently within a stream using a CPIM ("Common Presence and Instant Messaging") format, which is a MIME-type message format according to a RFC 3862 standard. When a third-party device D connects to a network node to capture at least one text signal, for example to archive the text exchanges of the communication, the device D will also keep the usability index as metadata in a form conforming to the CPIM format, which defines an envelope of the signals exchanged.

According to one embodiment of the invention, a usability index defines the usability of a signal according to its type. When a stream "Fi" is sent from a terminal "Ti", this stream may comprise a text signal Si1, an audio signal Si2, a video signal Si3, or an audiovisual signal Si4, for which the usability can be defined differently according to the attributes corresponding to the respective indices Mi1, Mi2, Mi3 and Mi4.

The method further comprises a step E400, CON, called the connection step, which is implemented when a third-party device D connects to at least one node of the network R.

When this third-party device D connects to the network node, it first reads the signal usability index or indices of the stream or streams transmitted via this network node and it checks whether it can access, read, process, and/or post-process the signals according to the values of these usability indices.

In particular, when the communication is implemented via an RCS, SDP, and/or SIP protocol, a third-party device D which connects to a network node checks whether it can use and more generally can capture the signals in accordance with the "<datausability>=<value>" line present in the SDP message or the message of another type of protocol, which started the communication and which had been transmitted to the network node.

According to one embodiment of the invention, the connection step E400 comprises a sub-step E410 of prohibiting access of the third-party device D to the corresponding signals if the usability index is a denial attribute.

Herein, the implementation of an access denial sub-step means that no access to the signals is authorized to the third-party device D, and therefore that processing of these signals is not possible while the third-party device D is connected to the network node or after the third-party device D is connected to the network node.

Thus, if the usability index is a denial attribute, the use of saved signals is prohibited for a third-party device D. In the event that a non-third-party device connects to the network node, meaning a device to which the operator or the user has given access authorization and/or authorization to process the signals transmitted during the communication on the network R, this non-third-party device can ignore the usability index.

For example, this sub-step E410 is implemented when the communication invitation message comprises a "<datausability>=<value>" line in which the value is defined as being "none" to prohibit making any use of the corresponding signal(s) of a stream of the subsequently transmitted communication.

As an illustration, a denial attribute may comprise a numerical value "1" or a text value "none", defining the value of a usability indicator M11 when a user does not want any text signal S11 in a stream F1 sent from his terminal T1 to be usable by a third-party device.

According to one embodiment of the invention, the connection step E400 comprises a sub-step E420 of reading signals by the third-party device D if the usability index is a processing attribute.

Herein, the implementation of a reading sub-step means that a processing of the signals, for example saving, is allowed, when the third-party device D is connected to the network node.

For example, this sub-step E420 is implemented when the communication invitation message comprises a "<datausability>=<value>" line in which the value is defined as being "live" to authorize making use of the signals of a stream but only during the communication.

As an illustration, a processing attribute can comprise a numerical value "2" or a text value "live", defining the value of a usability indicator M22 when a user wants an audio signal S22 in a stream F2 sent from his terminal T2 to be usable by a third-party device D, but only during the communication.

According to one embodiment of the invention, the connection step E400 comprises a sub-step E430 of post-processing the signals by the third-party device if the usability index is a post-processing attribute.

Herein, the implementation of a post-processing sub-step means that a processing of the signals, in particular a saving of the signals, is allowed while the third-party device D is connected to the network node or after the third-party device D is connected to the network node.

For example, this sub-step E430 is implemented when the communication invitation message comprises a "<datausability>=<value>" line in which the value is defined as being "post", to authorize making use of the signals of a stream but only after the communication has terminated.

As an illustration, a processing attribute may comprise a numerical value "3" or a textual value "post", defining the value of a usability indicator M33 when a user wants a video signal S33 in a stream F3 sent from his terminal T3 to be usable by a third-party device only after the communication.

Herein, saving a signal is a special case of processing or post-processing the signal. Thus, if the usability index is a processing attribute or a post-processing attribute, the signals can be processed by a third-party device D with or without saving these signals.

For example, to implement the saving of a signal read by a third-party device D during a reading sub-step E420, the usability index can be a processing with saving attribute. Alternatively, to prevent the saving of a signal read by a third-party device D during a reading sub-step E420, the usability index can be a processing without saving attribute.

For example, to implement the saving of a signal read by a third-party device D during a post-processing sub-step E430, the usability index can be a post-processing with saving attribute. Alternatively, to prohibit the saving of a signal read by a third-party device D during a reading sub-step E430, the usability index can be a post-processing without saving attribute.

This allows the user to authorize access to or to prohibit the storing of signals exchanged during the communication, while simultaneously allowing their processing or post-processing.

According to other embodiments of the invention, not shown, the invention can be extended to take into account attributes other than the three attributes of denial, processing, and post-processing. For example, a connection of a third-party device to a node could be implemented according to a usability index which comprises an encryption or post-encryption attribute, this attribute authorizing post-processing, for example the saving of a given signal by the third-party device, but making the reading of it, during or after communication, conditional on entering a password chosen by the user before transmission of this signal, etc.

According to one embodiment of the invention, a usability index can be supplemented with information relating to at least one recipient of a signal sent by the terminal initiating the communication.

Thus, the terminal "Ti" can be configured to supplement a usability index "Mik" with additional information "Mikl", the third index "l" denoting the recipient terminal "Tl".

Alternatively, the third index "l" can denote the third-party device D that has captured the signal or signals "Sik". For example, if a third-party device D has processed or saved the stream F2 of text signals S21 sent by a terminal T2 during a communication between three terminals T1, T2, and T3, an item of information "M21D" can be processed or saved on one of the terminals or on the third-party device D, for example for viewing later on.

This information can also be supplemented to specify whether or when the capture of the signal or signals "Sik" has involved reading, processing, post-processing, saving, etc. For example, if a terminal T2 has received the stream F1 of signals S1k sent by a terminal T1 during the communication, and a terminal T3 is added to this communication between T1 and T2 in order to read an audiovisual signal S14 associated with a usability index M14, an item of information M143 can be processed or saved on one of the terminals. This information can be carried in a signal sent from terminal T3 or the network node to which T3 is connected in order to read the signal S14.

Typically, this supplemental information is obtained by sending back to the source terminal a new signal comprising this information, from a network node to which terminal "Tl" or the third-party device having captured the signal or signal's "Sik" is connected.

According to one embodiment of the invention, a usability index can be saved at any time on a terminal, on a network node, or on a third-party device. This saving allows, for example, constructing a history of the selected usability of the signals or messages of a user, which can subsequently be consulted in order to check which signal was transmitted from his terminal, and possibly subsequently captured, for example in order to store a set of reads, post-processing occurrences, or access denials made for a given signal.

This also makes it possible to associate, with any transmitted signal, a proof of access of this signal in order to verify the security of the communication during or after its implementation.

The method further comprises a step 500, REC, called the receiving step, which is implemented by at least one second terminal T2, wherein the stream F1 is received from at least one node.

Figure 3:
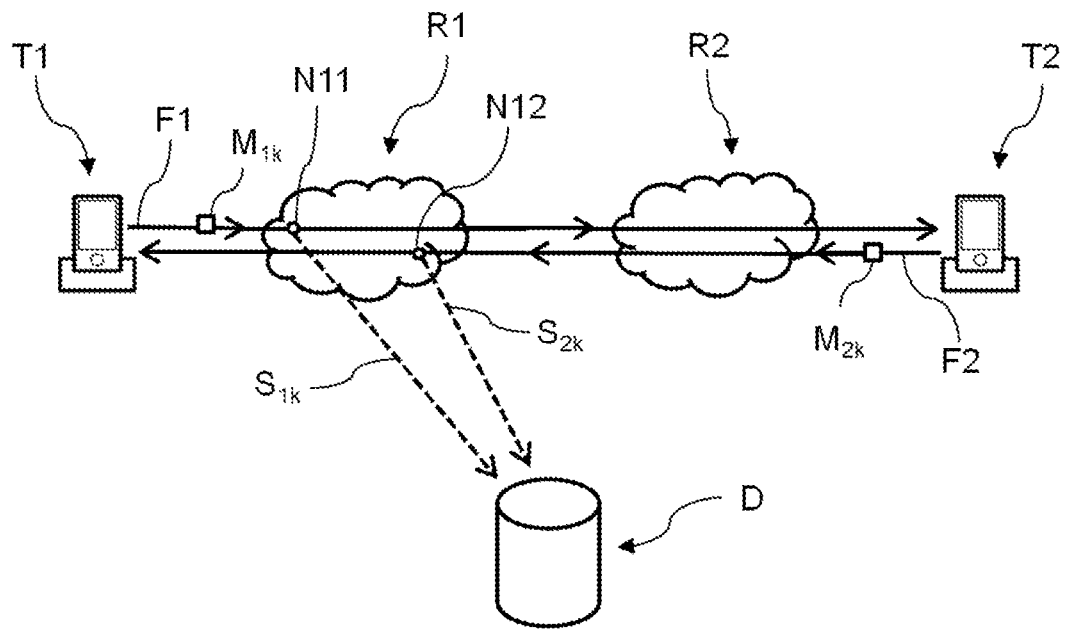
FIG. 3, FIG. 4, and FIG. 5, show schematic views of an environment comprising in particular two terminals and two networks for making a communication secure according to one particular embodiment of the invention.

In the case of the example illustrated in FIG. 3, a first terminal T1 is configured to transmit a stream F1 via a first network R1 and via a second network R2. A second terminal T2 can be configured to transmit a stream F2 via the second network R2 and via the first network R1 The two networks R1 and R2 allow a transmission of streams between them independently of the configurations of T1 and T2, although the access to the networks may be provided by two different operators.

If a third-party device D, for example an aggregator of an operator giving access to R1, is configured to be able to connect only to the first network R1 it can read, process, or save signals from the two streams by capturing a signal S1$k$ of F1 from a node N11 of the network R1 and/or a signal S2$k$ of F2 from another node N12 of the same network R1. The third-party device D will therefore read and receive the corresponding usability indices M1$k$ and M2$k$, which makes the usability of the communication secure when the third-party device D is only configured to connect to the first network R1 only.

Figure 4:
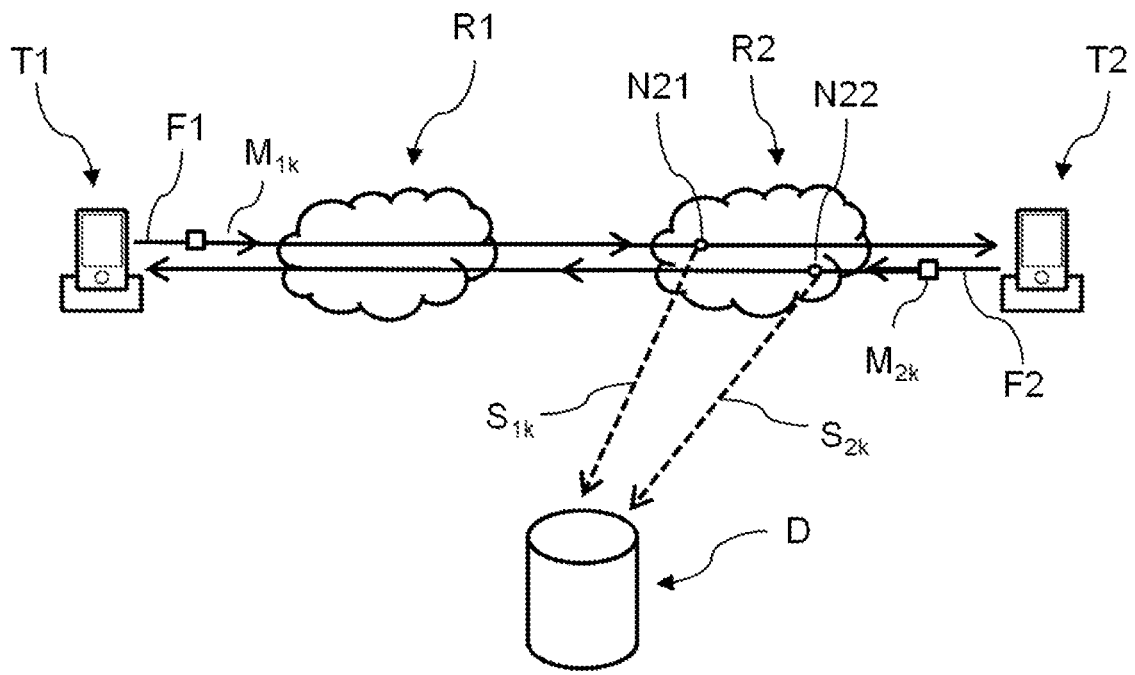

A similar situation is shown in FIG. 4: if a third-party device D, for example an aggregator of an operator giving access to R2, is configured to be able to connect only to network R2, in this case it is possible for it to read, process, or save signals from the two streams by capturing a signal S1$k$ of F1 from a node N21 of network R2 and/or a signal S2$k$ of F2 from another node N22 of the same network R2. The third-party device D will therefore read and receive the corresponding usability indices Mik and M2$k$, which makes the usability of the communication secure when the third-party device D is only configured to connect to the second network R2 only.

Figure 5:
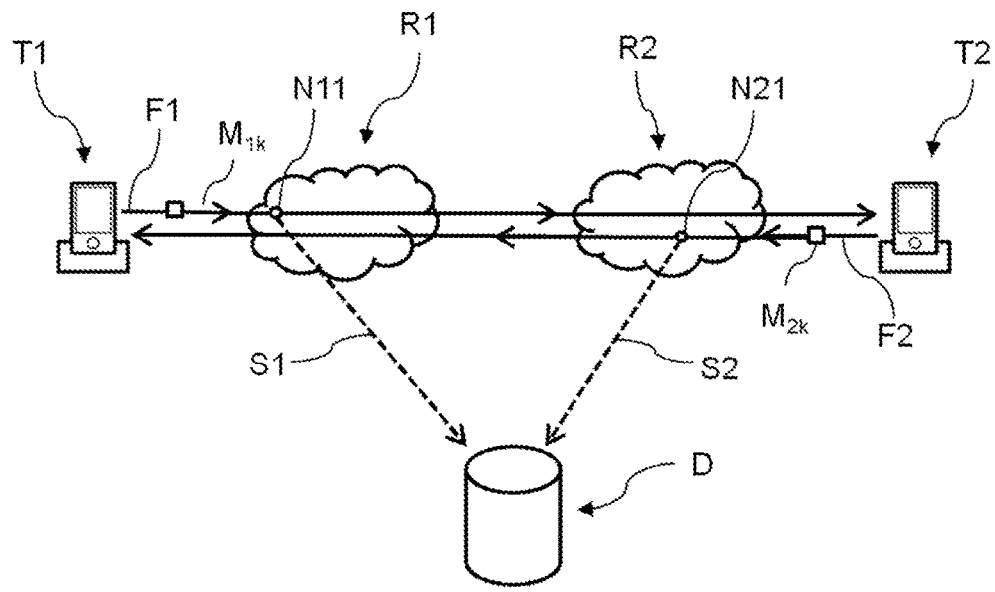

Another situation is illustrated in FIG. 5: when a third-party device D, for example an aggregator of an operator giving access to R1 and to R2, is configured to connect to one or the other of the two networks R1 and R2. In this case, it is possible for example for it to read, process, or save signals from the two streams by capturing a signal S1$k$ of F1 from a node N11 of network R1 and a signal S2$k$ of F2 from a node N21 of network R2. The third-party device D will therefore read and receive the corresponding usability indices M1$k$ and M2$k$, which allows making the communication secure when the third-party device D can connect to the two networks R1 and R2.

Figure 6:
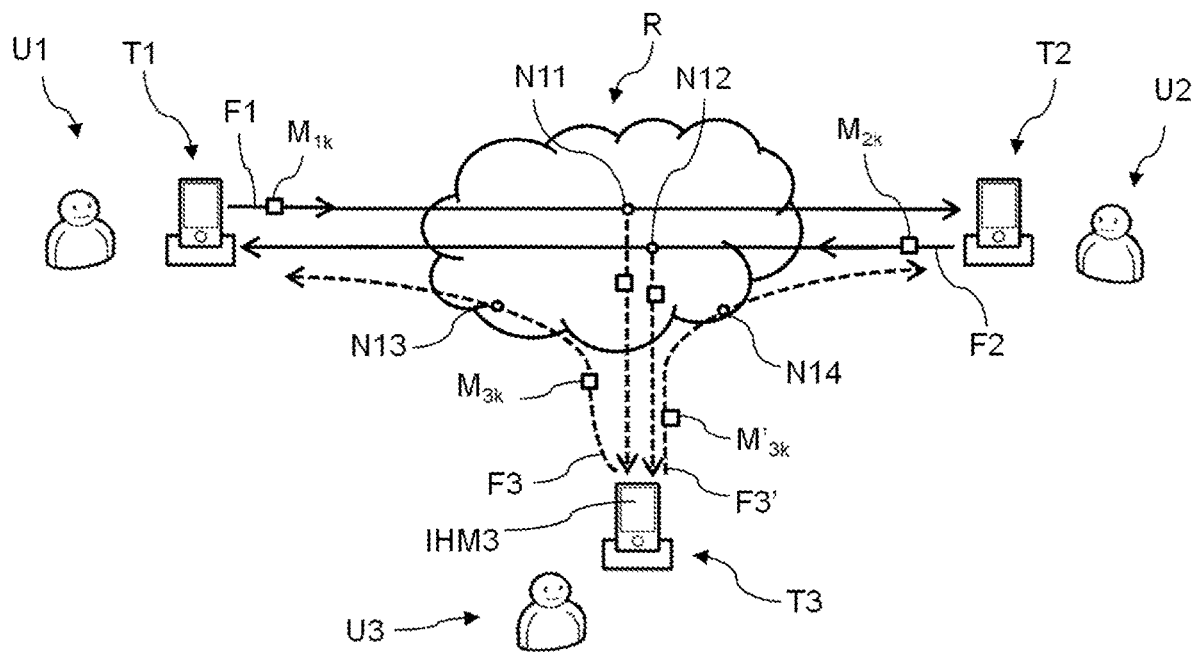
FIG. 6, shows a schematic view of an environment comprising in particular three terminals and a network for making a communication secure according to one particular embodiment of the invention.

An embodiment of the invention is now described with reference to FIG. 6, which represents an environment comprising two terminals T1 and T2 in communication with each other via a same network R comprising two nodes N11 and N12, and to which a third-party device connects. The third-party device here is a third terminal T3 configured to interact with a corresponding user U3 via a human-machine interface IHM3.

The method of the invention thus also applies in the case where the third-party device is a terminal T3, which is configured to intervene in the communication. Not only can T3 capture streams sent from T1 and T2 via a network R to which T1, T2, and T3 have access via their corresponding operators, but it also can transmit streams F3 and F3' of signals to T1 and T2. Terminal 13 can for example capture signals from stream F1 at a node N11 and signals from stream F2 at a node N12.

Thus, the security method of the invention prohibits terminal T3 from accessing the signals of F1 or F2 if the corresponding usability index/indices are prohibition/denial attributes; T3 is allowed to read these signals if the corresponding usability index/indices are processing attributes; and T3 is authorized to process or save these signals if the corresponding usability index/indices are post-processing attributes.

The security-improving method of the invention also allows user U3 to select on his terminal T3 the usability indices M3$k$ and M'3$k$ for signals in streams, in particular signals in a stream F3 transmitted from T3 to a node N13 of the network R then to terminal T1, and in a stream F3' transmitted from T3 to a node N14 then to terminal T2, in the event that a third-party device or a new terminal is capturing a stream of signals sent from 13. A third-party device or another terminal, not shown, may also connect to any network node through which passes a stream of the communication between two terminals among T1, T2, and T3. The method of the invention is applicable to this device or to this other terminal.

Figure 7:
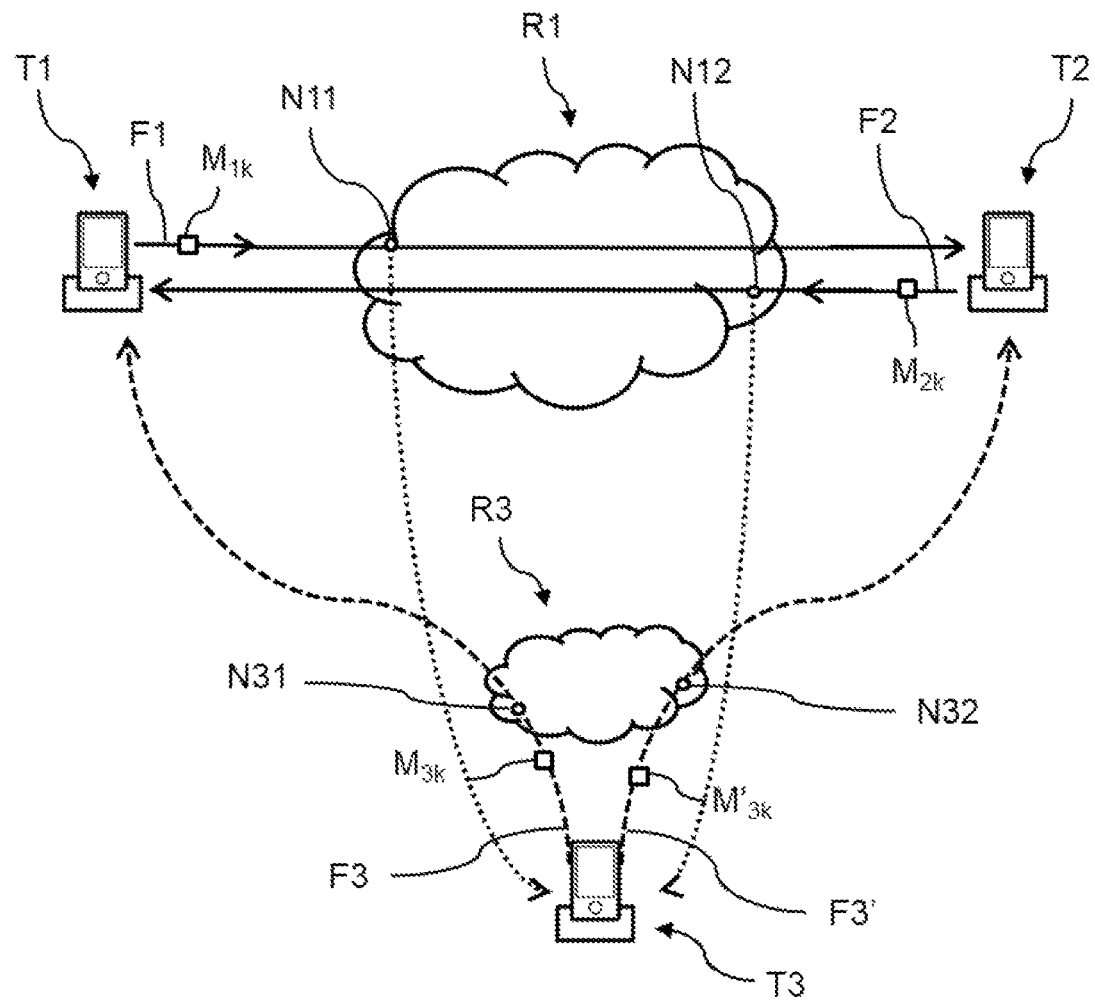
FIG. 7, shows a schematic view of an environment comprising in particular three terminals and two networks for making a communication secure according to one particular embodiment of the invention.

Another embodiment of the invention is shown in FIG. 7, which represents an environment comprising two terminals T1 and T2 in communication with each other by means of a same network R1 comprising two nodes N11 and N12, but to which a third terminal 13 connects in order to communicate with T1 and 12 by means of a separate second network R2 comprising two nodes N31 and N32. Terminal T3 can capture signals from F1 in node N11 and signals from F2 in node N12.

The method of the invention makes it possible to make secure the usability of the signals sent and received by T3 accessing the communication between T1 and T2, via the network R2 of an operator distinct from the one providing access to R1.

As above, on terminal T3, usability indices M3$k$ and M'3$k$ for signals in streams can be selected by user U3 to secure the usability of signals in a stream F3 transmitted from T3 to a node N31 of network R3 then to T1 and in a stream F3' transmitted from T3 to a node N32 of the same network R3 then to T2.

Figure 8:
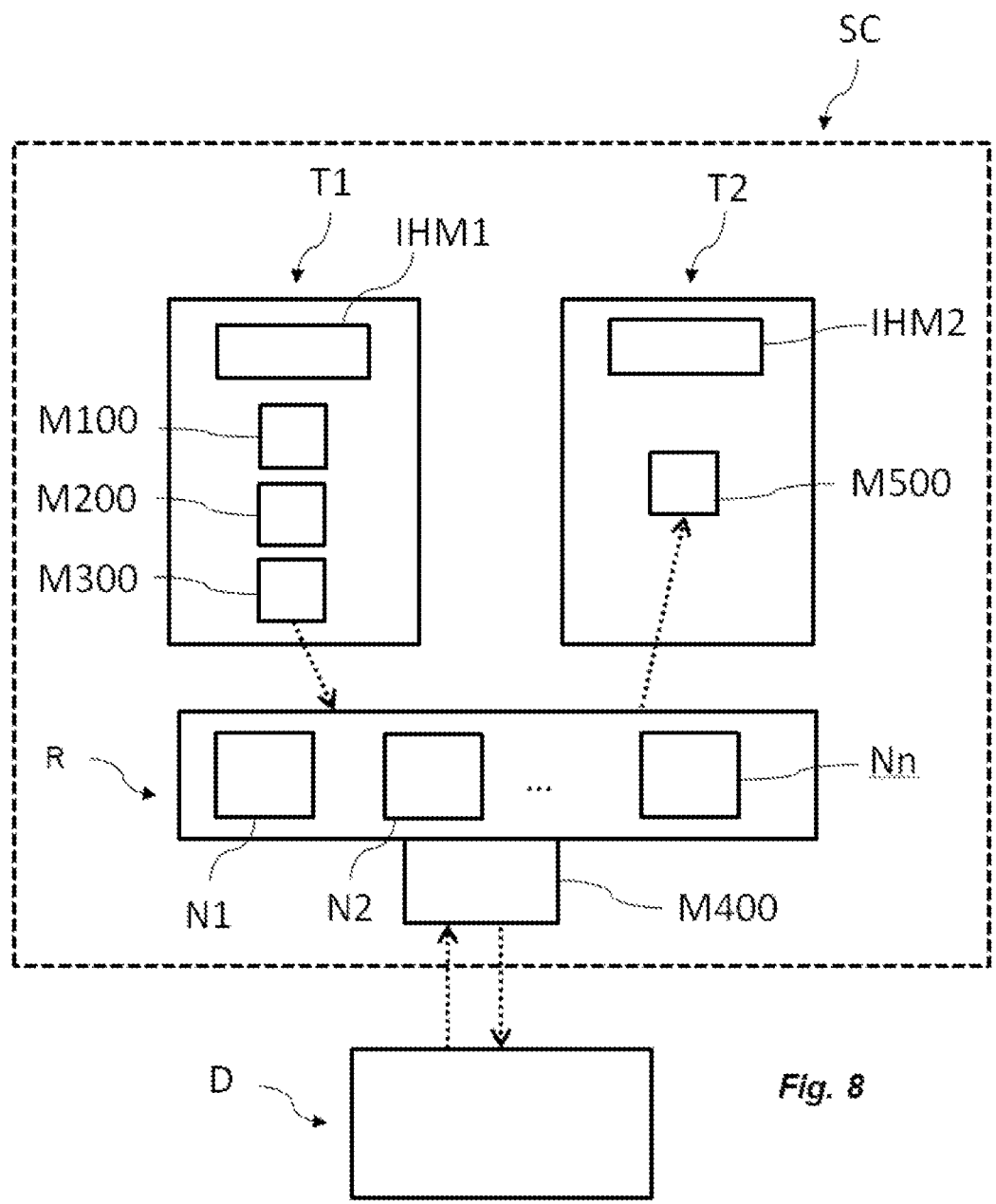
FIG. 8, shows a schematic view of a system for making a communication secure according to one particular embodiment of the invention.

FIG. 8 illustrates a communication system SC used to make a communication secure between two terminals T1 and T2 via a network R, a third-party device D being able to connect to this network, in accordance with all of the embodiments set forth to this point.

The system SC comprises the first terminal T1, which itself comprises modules configured to implement the steps and sub-steps of the method. These modules are hardware and/or software components. A software component may be a computer program or a subroutine thereof, capable of implementing a function or a set of functions depending on the module concerned.

Terminal T1 includes an initialization module M100 configured to send an invitation message for a communication between T1 and T2. The module M100 can also be configured to implement step E100 and/or to allow user U1 to start up terminal T1, to identify user U1, to initialize other modules of T1, or to authenticate T1 on one or more networks.

Terminal T1 further comprises a selection module M200, configured to allow a user T1 to select a usability index for the signals transmitted therefrom. For example, before establishing a communication with another terminal, the module M200 offers the user a menu, for example via the human-machine interface IHM1 of T1, with various selectable options for making the signals secure.

The functionality can also make it possible to display a warning or a security icon for given signals when a third-party device D or another terminal T3 accesses a stream or streams or captures signals from a communication established between T1 and T2. This icon can alert the user to the possibility of modifying the value of a usability index for a signal during the communication. For example, if a new user U3 is added to the communication via a new terminal T3, user U1 and/or U2 may decide to deny him access to all their audiovisual signals for confidentiality reasons.

According to one embodiment of the invention, module M100 and/or module M200 are configured to read, process, and save at least one usability index provided by the user, and to insert it as an attribute in an invitation message, which indicates whether and when the signals in the stream can be made use of according to the communication protocol used.

The source terminal T1 further comprises a module M300 for transmitting a stream to a network R, and in particular to a plurality of nodes N1, N2, . . . , Nn of this network through each of which a stream of signals may pass before being transmitted to a reception module M500 comprised in the destination terminal T2. These modules M300 and M500 are, for example, transmission-reception antennas, or any other means suitable for implementing a communication according to the invention.

In a non-limiting manner, terminals T1 and T2 each comprise a communication module allowing them to connect to one or more networks of an operator and to exchange streams of signals with other devices by means of these networks. For example, the communication module may be a mobile telephone interface or a Wifi or Ethernet network interface.

The system SC further comprises a module M400 configured to allow a third-party D device to connect to the network R. When this device D is a terminal, module M400 is configured to allow it to send streams of signals to the network R, and to terminals T1 and T2.

According to one embodiment of the invention, the network R or at least one node of the network to which the third-party device D is likely to connect comprises module M400.

When a stream of signals passes through one of the nodes N1, N2, . . . , Nn and a third-party device D connects to this node, the connection module M400 is configured to implement at least one of the following actions: prohibit D from accessing these signals if the usability index is a denial attribute, authorize D to read these signals if the usability index is a processing attribute, and/or allow D to process or save the signals if the usability index is a post-processing attribute. Furthermore, these actions can be implemented independently of one another depending on the type of signal.

According to one embodiment of the invention, the system SC further comprises at least one integrated circuit comprised in terminal T1 and/or T2, in at least one node of the network R, or in any other electronic device separate from the system SC. In particular, this or these integrated circuits are configured to implement the steps of the method of making secure a communication initiated by terminal T1 and received by terminal T2.

This or these integrated circuits comprise a storage space, for example a memory, and a processing unit equipped for example with a processor. The storage space is for example a non-volatile memory (ROM or Flash, for example), and can constitute a storage medium, this storage medium also being able to comprise a computer program.

During initialization, the instructions of a program controlling the processing unit are for example loaded into a volatile memory (RAM, for example), not shown, which is comprised in the system SC, before being executed by the processor of the processing unit.

According to one embodiment of the invention, this or these integrated circuits are configured to implement the steps of the method of making secure a communication initiated by terminal T1 and received by terminal T2.

The invention claimed is:

1. A method of making secure a communication between a first terminal and at least one second terminal, the method comprising:
   selecting, on the first terminal, a usability index for signals in a stream;
   transmitting the stream from the first terminal to at least one node of a network;
   connecting a third-party device to the at least one node according to the usability index; and
   receiving, on the at least one second terminal, the stream from the at least one node; and
   wherein each of the first terminal and at least one second terminal is configured to interact with a user via a corresponding human-machine interface.

2. The method according to claim 1, wherein the connection comprises a denial of access by the third-party device to the signals if the usability index is a denial attribute.

3. The method according to claim 1, wherein the connection comprises an authorization for the third-party device to read the signals if the usability index is a processing attribute.

4. The method according to claim 1, wherein the connection comprises an authorization for the third-party device to post-process signals if the usability index is a post-processing attribute.

5. The method according to claim 1, wherein the usability index is comprised in a transmission initiation message, the message being sent by the first terminal after the selection and before the transmission.

6. The method according to claim 1, wherein the communication is implemented via a communication protocol selected among: an RCS protocol, an SDP protocol, an RTSP protocol, an MSRP protocol, and/or a SIP protocol.

7. The method according to claim 1, wherein the connection comprises a modification of the usability index by the first terminal.

8. The method according to claim 1, wherein at least one signal of the signals in the stream is a type of signal on which the usability index depends, and is selected among: a text signal, an audio signal, a visual signal, and/or an audiovisual signal.

9. The method according to claim 1, wherein the third-party device is at least a third terminal configured to interact with a corresponding user via a human-machine interface.

10. A communication system configured to make a communication secure between a first terminal and at least one second terminal, the system comprising:
    the first terminal, comprising a selection module for selecting a usability index for signals in a stream and comprising a transmission module for transmitting the stream to at least one node of a network;
    a connection module for connecting the at least one node to a third-party device according to the usability index; and
    the at least one second terminal, comprising a reception module for receiving the stream from the at least one node; and
    wherein each of the first terminal and at least one second terminal is configured to interact with a user via a corresponding human-machine interface.

11. The communication system according to claim 10, wherein the connection module prohibits the third-party device from accessing the signals if the usability index is a denial attribute.

12. The communication system according to claim 10, wherein the connection module allows the third-party device to read the signals if the usability index is a processing attribute.

13. The communication system according to claim 10, wherein the connection module allows the third-party device to post-process the signals if the usability index is a post-processing attribute.

14. The communication system according to claim 10, wherein the first terminal further comprises an initiation module, the initiation module being configured to send a transmission initiation message, the message comprising the usability index.

15. A non-transitory computer-readable storage medium storing instructions of a computer program for implementing the method according to claim 1 when the computer program is executed by a processor.

16. The method of claim 1, further comprising the human-machine interface of the second terminal being configured to present data comprised in the stream.

17. A method for requesting a communication between a first terminal and at least one second terminal to be made secure, the method comprising:
- the first terminal selecting a usability index of signals of a communication stream to the at least one second terminal, the usability index of the signals comprising an attribute which expresses a rule which authorizes, limits or prohibits a use of the signals in the stream by a third-party device;
- the first terminal sending the usability index of the signals in a message for initiating a transmission of the communication stream to a node of a communication network; and
- the first terminal transmitting the signals of the communication stream to the at least one second terminal via the node of the communication network.

* * * * *